UNITED STATES PATENT OFFICE.

IVAN LEVINSTEIN AND CARL MENSCHING, OF MANCHESTER, ENGLAND.

BLACK SULFUR DYE AND PROCESS OF MAKING SAME.

SPECIFICATION forming part of Letters Patent No. 706,969, dated August 12, 1902.

Application filed May 22, 1902. Serial No. 108,538. (No specimens.)

*To all whom it may concern:*

Be it known that we, IVAN LEVINSTEIN, a subject of the King of Great Britain, and CARL MENSCHING, a subject of the German Emperor, and both residents of Manchester, in the county of Lancaster, England, have invented new and useful Improvements in Black Coloring-Matters Containing Sulfur and Process of Making Same, of which the following is a specification.

We have found that very valuable black dyestuffs directly dyeing cotton can be produced from the disazo compounds which are obtained by allowing two molecules of the same or of two different diazo compounds to act upon one molecule of phenol. We find that the azo compounds from one molecule of phenol, coupled with two molecules of diazotized para-nitranilin or the azo compounds from one molecule of phenol with one molecule of diazobenzene and one molecule of diazotized para-nitranilin, are most suitable, since they yield on heating with sulfur and sodium sulfid more advantageously in the wet way—that is to say, by boiling an aqueous solution of the mixture under a reflux-condenser for a sufficient time—very bright and deep shades of black. Furthermore, we have found that the said azo combinations, instead of being used alone, can be mixed with equimolecular proportions of para-oxy-dinitrodiphenylamin, thus obtaining very bright and fast shades of a bluer shade of black.

The following are examples of the processes which we may employ in carrying out our invention; but it is to be understood that we do not limit ourselves either to the proportions of sodium sulfid or of sulfur or to the temperatures therein specified.

We may add to the reaction mixtures described in the examples suitable metallic salts, and more particularly copper sulfate.

Example I: 39.2 kilos of the disazo compound obtained by coupling two molecules of diazotized paranitranilin with one molecule of phenol are added to a hot solution of fifteen kilos of sulfur, eighty kilos of crystallized sodium sulfid, and fifty-five liters of water. This mixture is heated to the boiling-point in a suitable vessel under a reflux-condenser and is kept at that temperature for about twenty hours, when the coloring-matter is precipitated either by blowing in a current of air or by the addition of acid. The coloring-matter so produced can be used at once for dyeing in conjunction with sodium sulfid. It produces on unmordanted cotton deep greenish-black shades which are fast to light and to washing.

Example II: 34.7 kilos of the disazo color, produced by combining in alkaline solution one molecule of phenol with one molecule of diazobenzene and one molecule of diazoparanitranilin and 27.5 kilos of para-oxy-dinitrodiphenylamin, are together mixed with forty-two kilos of sulfur and one hundred and forty kilos of crystallized sodium sulfid in one hundred and fifty liters of water. The mixture is boiled as described under Example I and the produced dyestuff is precipitated by the same means. It dyes unmordanted cotton deep black shades.

What we claim as our invention, and desire to secure by Letters Patent, is—

1. The manufacture of black sulfur coloring-matters which consists in heating with sulfur and alkali sulfid, a nitro derivative of phenol-disazobenzene in equimolecular proportion with para-oxy-dinitro-diphenylamin, substantially as set forth.

2. As products, the black sulfur coloring-matters obtained by heating with sulfur and alkali sulfid, a nitro derivative of phenol-disazobenzene in equimolecular proportion with para-oxy-dinitro-diphenylamin, which are insoluble in alcohol and in concentrated sulfuric acid, dissolve in caustic lye and more freely in sodium-sulfid solution with a greenish-blue shade, and which dye unmordanted cotton deep greenish-black shades fast to light and to washing.

3. The manufacture of black sulfur coloring-matters, which consists in heating with sulfur and alkali sulfid, a nitro derivative of phenol-disazobenzene, substantially as set forth.

4. As products, the black sulfur coloring-matters obtained by heating with sulfur and alkali sulfid, a nitro derivative of phenol disazobenzene, which are insoluble in alcohol and in concentrated sulfuric acid, dissolve in caustic lye and more freely in sodium-sulfid solution with greenish-blue shades, and which dye unmordanted cotton deep black shades.

In testimony whereof we have signed our names to this specification in the presence of two subscribing witnesses.

IVAN LEVINSTEIN.
CARL MENSCHING.

Witnesses to the signature of Ivan Levinstein:
HEDWIG LEVINSTEIN,
ED. BOUTFLOWER.

Witnesses to the signature of Carl Mensching:
WILLIAM E. HAYS,
ARTHUR MILLWARD.